United States Patent Office 3,236,789
Patented Feb. 22, 1966

3,236,789
PROCESS FOR MAKING FOAMED
POLYCAPROLACTAM
Mack Francis Fuller, Woodbury, N.J., assignor to E. I.
du Pont de Nemours and Company, Wilmington, Del.,
a corporation of Delaware
No Drawing. Filed Feb. 6, 1962, Ser. No. 171,356
11 Claims. (Cl. 260—2.5)

This invention relates to foamable compositions and to a process for the preparation of solid foams. More particularly, this invention relates to polymerizable, foamable compositions based on ε-caprolactam.

A process for the preparation of foamed or cellular polycaprolactam compositions is disclosed in copending patent application Serial No. 135,801, filed September 5, 1961, by Melvin I. Kohan and assigned to the same assignee as this application. In some embodiments of that process, chemical blowing agents are utilized to produce foamed compositions by incorporating a chemical blowing agent in a suitably catalyzed ε-caprolactam composition, optionally containing other additives which may modify the properties of the resulting foamed composition, and heating said foamable composition until polymerization, foaming, and solidification of such composition is achieved.

Experience has shown, however, that the use of chemical blowing agents known to the prior art in a process for producing polycaprolactam foams by foaming simultaneously with the promoted anionic polymerization of ε-caprolactam is difficult to control in a manner such as to produce a fine, uniform foam having the desired bulk density and a smooth surface skin. The problem is to obtain the desired degree of foaming at just the point in time when polymerization has proceeded to a point just short of gelation. Many chemical blowing agents of the prior art decompose too soon and too rapidly under the conditions of polymerization to make the process readily adaptable to commercial production. The azonitriles such as azo-bis(1-cyanocyclohexane) and azo-bis(isobutyronitrile) are examples of such overly-active blowing agents. On the other hand, azides, such as cyclohexylazide and dodecylazide, fail to decompose sufficiently under preferred polymerization conditions, which are at temperatures below 215° C., the melting point of polycaprolactam, before the time of gelation and solidification of the polymerization mixture.

Therefore, an object of this invention is to provide chemical blowing agents suitable for use during the promoted, anionic polymerization of ε-caprolactam which will decompose at a rate synchronized with the rate and temperature of the polymerization to produce a uniform, fine cell structure in the resulting solid foam. Another object of this invention is to provide a process for the preparation of polycaprolactam foams of uniform cell structure by polymerization at a temperature above the melting point of monomeric ε-caprolactam but below the softening temperature of polycaprolactam. Another object of this invention is to provide polymerizable, foamable compositions comprising catalyzed ε-caprolactam and novel chemical blowing agents. Other objects and advantages of this invention will appear hereinafter.

It has now been found, in accord with the objects of this invention, that an improved foamable composition based on caprolactam comprises anionically catalyzed ε-caprolactam, a cocatalyst or promoter, and, as a blowing agent, a substituted allylic azide. The allylic azides, which term includes benzyl azides, particularly suitable in accordance with this invention are substituted allylic azides corresponding to the generic formula:

$$\underset{R_1}{\overset{R_2}{\diagdown}}C=\underset{R}{C}-CH_2N_3$$

in which at least one azidomethyl group is directly attached to a carbon atom which in turn is attached to another carbon atom by a double bond which may occupy a position in either a linear or a cyclic structure. Thus, in the above generic formula, R, $R_1$, and $R_2$ may be hydrogen, alkyl groups, aryl groups and substituted alkyl and aryl groups; in the case of the benzyl azides the >C=C< linkage will be included within an aromatic ring structure, in which case R and $R_1$ taken together in the formula above represent the carbon atoms completing the aromatic or benzenoid ring, which may also have additional substituents attached to the carbon atoms of the ring.

The allylic azides are prepared by reacting an allylic halide with an alkali metal azide in a polar solvent. As the alkali metal azide, it is preferable to use sodium azide; and as the polar solvent, it is preferable to use ethanol containing from 2 to 5% by weight of water. The reaction, which is a methathesis reaction, takes place over a wide temperature range; it is preferable to carry out the reaction at reflux temperature and at atmospheric pressure. The allylic azide may be recovered from the reaction mass by conventional means, for example, by diluting the reaction mass with a large excess of water and extracting the allylic azide with an organic solvent, and thereafter evaporating the solvent.

The allylic azides have been found to be especially effective blowing agents for use in foaming a cocatalyzed anionic caprolactam composition during the polymerization thereof. In view of the anticipated low rate of nitrogen release from allylic azides at the temperatures used for polymerization, their effectiveness in cocatalyzed caprolactam compositions is surprising. While this invention is not limited by any theory, it seems likely that an important factor in the successful use of allylic azides for making foamed polycaprolactam compositions is the presence of a metal base in the anionically catalyzed and cocatalyzed caprolactam composition. It has been found that the base employed to produce the anionic polymerization catalyst present in said caprolactam composition also significantly catalyzes the decomposition of the allylic azide so that it becomes a highly useful chemical blowing or foaming agent in said caprolactam compositions at temperatures in the range of 100°–215° C.

The true anionic catalyst employed in the polymerization of ε-caprolactam is the reaction product of the lactam with an alkali-metal base or an alkaline earth metal base or with a metal-alkyl base derived from zinc or aluminum. The anionic catalyst, then, is a caprolactam anion formed by the removal of the proton on the nitrogen of the lactam by reaction of the lactam with a metal base having a strength sufficient to remove the proton attached to the lactam nitrogen atom, as for example in the reaction indicated by the equation

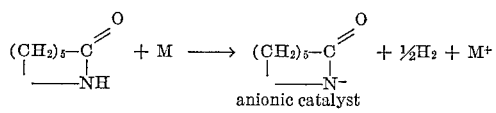

where M is a metal such as Na. Analogous reactions occur with the metal bases described hereinbelow, which all form this anionic catalyst. The alkali and alkaline earth metal bases suitable for reaction with ε-caprolactam to form the anionic catalyst include the free metals, the metal hydrides, the metal alkoxides, the hydroxides, the carbonates, the metal alkyls and aryls, including Grignard reagents (RMgX where R is alkyl or aryl and X is chlorine, bromine, or iodine), and metal amides such as $NaNH_2$, $MgNH$, $Mg(NH_2)_2$, $Mg(N(CH_3)_2)_2$,

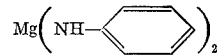

etc. Specific examples of organometallic bases suitable include diethyl zinc, diphenylmagnesium, triisopropyl aluminum, sodium ethyl, lithium aluminum hydride, and the like. Any of the above are suitable to produce the catalyst wherever hereinafter the term "anionic catalyst" is employed. Likewise omega-lactams other than caprolactam can be used to form the anionic catalyst—e.g. enantholactam, pyrrolidone, piperidone, and in general omega-lactams having from 5 to 12 lactams in the lactam ring.

The cocatalysts, sometimes termed promoters, suitable for employment in combination with the anionic catalyst, are those which markedly promote the rate of anionic polymerization of ε-caprolactam at temperatures below 215° C., the melting point of polycaprolactam. Preferred cocatalysts include isocyanates and diisocyanates, N,N-dihydrocarbyl carbamyl chlorides, and symmetrical triazine derivatives having the structure

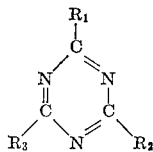

where $R_1$ is aryloxy, alkaryloxy, nitroaryloxy or halide, and $R_2$ and $R_3$ may be the same as $R_1$ or may be dialkylamino, hydrogen, alkyl, alkenyl, aryl, or alkaryl, as described in the copending application of Kohan and Munn, S.N. 135,791.

Other effective cocatalysts include polymeric fluoromethylene sulfides having the structure

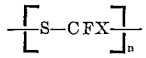

where X is F or Cl and $n$ indicates the degree of polymerization, which may be only 2 in the case of the cyclic dimer, but represents a high degree of polymerization in the case of linear polymers, as more fully described in the copending application of Donald S. Acker, S.N. 138,301, and the combination of the sym-triazine derivatives described hereinabove with an N,N'-substituted urea

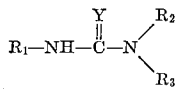

where Y is oxygen or sulfur and $R_1$ and $R_2$ represent alkyl and $R_3$ may be alkyl or H and where $R_1$ and $R_3$ may be connected to form a cyclic tetramethylene chain.

Other promoters which can be used include acylating agents such as ketenes, acid chlorides and anhydrides, and the reaction products of such acylating agents with the lactam, the N-acyl lactams (including a combination of an acid chloride or anhydride with an N,N'-substituted urea such as has been described hereinabove), halogenated alkanones and cycloalkanones, as described in the copending application of M. I. Kohan, S.N. 127,908, dilactim ethers having the structure

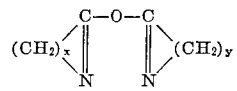

as described in the copending application of M. I. Kohan, S.N. 135,792, and benzimido compounds of the structure

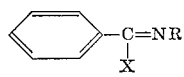

where R is a hydrocarbon radical and X is halogen or —OR, as described in the copending application of Anderson and Kohan, S.N. 138,302.

Wherever hereinafter the terms "cocatalyst" or "promoter" are employed, any of the above classes are intended and are suitable in the process and composition of this invention.

The foamed polycaprolactam is prepared in accordance with this invention by forming a solution of one of the allylic azides described in an anionic-catalyzed and cocatalyzed melt of ε-caprolactam and maintaining the solution at a temperature between 100 and 215° C. until the polycaprolactam formed has solidified as a foam. In general, a preferred method is to dissolve the blowing agent and the cocatalyst in a portion of the ε-caprolactam at a temperature of about 140–160° C. and mix this portion with molten ε-caprolactam containing the anionic catalyst at a temperature between about 140 and 160° C. and hold the mixture at the elevated temperature until foaming and solidification occur. The caprolactam containing the anionic catalyst can be prepared in advance by reaction of an omega-lactam with one of the metal bases previously described at a temperature in the range of 85° to 120° C. and can then be stored at room temperature until needed.

The synthesis of new allylic azide blowing agents and the foamable caprolactam compositions containing substituted allylic azide blowing agents will be more readily apparent from the examples which follow.

EXAMPLE 1

The allylic azides listed in column 2 of Table I were prepared as follows: The allylic halide indicated in column 3 in the amount shown in column 4 and sodium azide in the amount shown in column 5 were added to a mixture of 95% ethanol and absolute ethanol in the quantities shown in columns 6 and 7. The reaction mixture thus obtained was placed in a suitable reaction flask with a reflux condenser and was heated to reflux temperature at atmospheric pressure for 16 to 20 hours.

To obtain allylic azide A, the reaction mixture was cooled to room temperature and filtered to remove inorganic salts, and the salts were washed once with 150 ml. of absolute ethanol. The combined solution comprising alcoholic filtrate and washings was evaporated to a volume of about 1500 ml. and then mixed with 2500 ml. of distilled water at room temperature. The allylic azide was separated from the aqueous alcohol by making 3 successive extractions, using 300 ml. of petroleum ether (B.P. 35–60° C.) for each extraction. The petroleum ether extracts were combined and washed by successively shaking with each of four 500-ml. portions of water, separating and discarding the wash water each time. The washed petroleum ether solution was dried over 40 g. of anhydrouss sodium sulfate, decanted from the sodium sulfate, and treated with 5 g. of decolorizing carbon. The carbon was separated by filtration and the petroleum ether filtrate was evaporated by bubbling dry nitrogen through the solution at room temperature until a constant weight of residue was reached. The product thus obtained weighed about 225 g. The nitrogen content determined by the Dumas method of analysis (column 10) was 18.3% (theory=20.1% N, column 9). In a gas evolution test (columns 11 and 12) 103 ml. of nitrogen was evolved per gram of azide as compared with the calculated quantity of 107 ml. The gas evolution test is a measure of the relative blowing power of the azide being tested.

The reaction mixtures containing allylic azides B to H were processed in a similar manner, adjusting the volumes of solvents, water, etc., in the same proportion which the volume of reaction solvent bore to the volume of reaction solvent used for allylic azide A. Benzene instead of petroleum ether was used as the extractant for allylic azides B, C, D, E, F, and H in Table I, and the ethyl ether was used for extraction of allylic azide G.

The reaction mixture for allylic azide I in Table I was worked up in a slightly different manner. The hot reaction mixture was filtered and the filtrate was cooled to room temperature and diluted with 200 ml. of water. The allylic azide precipitated as a solid which was collected by filtration. The solid was dissolved in the minimum quantity of boiling 95% alcohol (about 100 ml.), the hot solution was filtered, and the filtrate was mixed with 100 ml. of water, which caused the product to separate as a crystalline solid. The crystals were separated by filtration and then dried over $P_2O_5$ at reduced pressure. Allylic azide I weighed about 8 g., contained 34.7% nitrogen (column 10) and released 180 ml. of nitrogen per gram (column 12) in the gas evolution test. The gas evolution test not only provides a measure of the potential blowing power of each of the allylic azides but also may serve as a guide to the actual weight of the azide to be employed in a foamable caprolactam composition.

Table I

| | Allylic azide | | Reaction mixture | | | | | Product | | | | |
|---|---|---|---|---|---|---|---|---|---|---|---|---|
| Item | Name and formula | | Allyl halide | | $NaN_3$ Wt., g. | Reaction solvent | | Physical form | Percent N-content | | Gas evolved (ml./g.) [1] | |
| | | | Name | Wt., g. | | 95% ethanol, ml. | Abs. EtOH, ml. | | Calcd. | Found | Calcd. | Found |
| Col. 1 | Col. 2 | | Col. 3 | Col. 4 | Col. 5 | Col. 6 | Col. 7 | Col. 8 | Col. 9 | Col. 10 | Col. 11 | Col. 12 |
| A | 1-azido-5,5,7,7-tetramethyl-octene-2. $CH_3C(CH_3)_2CH_2C(CH_3)_2$ $CH_2CH=CHCH_2N$ | | Dodecenyl chloride [2] | 284 | 109 | 1,050 | 1,050 | Liquid. | 20.1 | 18.3 | 107 | 103 |
| B | o-Methylbenzyl azide  | | o-Methylbenzyl bromide. | 8 | 3.2 | 50 | 50 | ...do... | 28.6 | 23.2 | 152 | 124 |
| C | m-Methylbenzyl azide  | | m-Methylbenzyl bromide. | 8 | 3.2 | 50 | 50 | ...do... | 28.6 | 23.1 | 152 | 127 |
| D | p-Methylbenzylazide  | | p-Methylbenzyl bromide. | 12.2 | 5.8 | 90 | 90 | ...do... | 28.6 | 22.2 | 152 | |
| E | 3,4-dimethylbenzyl azide  | | 3,4-dimethylbenzyl chloride. | 15.4 | 8.0 | 65 | 65 | ...do... | 26.1 | 25.3 | 139 | |
| F | 2,4,5-trimethylbenzyl azide  | | 2,4,5-trimethylbenzyl chloride. | 6.0 | 3.2 | 50 | 50 | ...do... | 24.0 | 23.2 | 128 | 125 |
| G | Dodecylbenzyl azide  | | Dodecylbenzyl chloride (tech.) [3] | 29.2 | 8.0 | 150 | 150 | ...do... | 13.9 | 14.9 | 75 | |
| H | p-Phenoxybenzyl azide  | | p-Phenoxybenzyl chloride. | 10.9 | 4.6 | 65 | 65 | ...do... | 18.7 | 15.2 | 100 | 95 |
| I | $\alpha^1,\alpha^4$-Diazidohexamethyl-benzene.  | | $\alpha^1,\alpha^4$-Dichlorohexa-methylbenzene. | 11.6 | 10.0 | 75 | 75 | Solid. | 34.4 | 34.7 | 184 | 180 |

[1] Gas evolution test: a weighed sample of the azide in dioctyl phthalate is heated to about 220° C. The gas evolved (one mole $N_2$ per azide gruop is collected, measured, and calculated to STP conditions.
[2] Commercial product; may have contained a small amount of the 3-isomer.
[3] Commercial product; orientation of dodecyl group not known.

EXAMPLE 2

The preparation of foamed polycaprolactam compositions was accomplished by incorporating the allylic azide in either one or both of the two caprolactam-based formulations shown below, after which the foamable mixture was held in a bath at about 150° C. until polymerization, foaming, and solidification were complete. At no time did the temperature of the mixture exceed the melting point of polycaprolactam.

Formulation 1 included the following ingredients in the amounts indicated:

| | Grams |
|---|---|
| ε-Caprolactam, dry | 16.0 |
| Sodium methoxide | 0.065 |
| Potassium stearate | 0.08 |
| Promoter [adduct of 2 moles of caprolactam with 1 mole of methylene-bis(4-phenyl isocyanate)] | 0.14 |

Formulation 2 was similar to Formulation 1, but with the addition of 0.32 g. of a mixed 66/610/6 polyamide powder which acts as a foam stabilizer during the early stages of the polymerization of the caprolactam. The procedure for foaming the caprolactam composition was substantially the same for both formulations.

Foaming of a composition containing allylic azide A (Table I) was carried out as follows: The caprolactam, sodium methoxide, and potassium stearate of Formulation 1 (plus polyamide for Formulation 2) was placed in a 25×200 mm. test tube which was heated in an oil bath at 150° C. The molten mixture was sparged with dry nitrogen at a rate of 350 cc./minute for 20 minutes. The cocatalyst was added and mixed by nitrogen-sparging for 25 seconds, after which the sparger head was raised above the level of the contents of the tube. After 10 minutes, the tube was removed from the bath, cooled to room temperature, and the foamed polycaprolactam was removed for examination.

In Table II are shown the amounts of allylic azides A to I which were employed in preparing a series of foamable compositions in the manner described above. In addition, Table II shows some of the characteristics of the foams obtained. Whereas unfoamed polycaprolactam has a bulk density of 71 to 72 lb./cu. ft., the foamed compositions exemplified had densities less than half as great. Another notable characteristic of the foamed compositions of this invention is the uniform distribution of the fine gas-filled cells within the mass of material. In general, the foamed polycaprolactam has the shape of the container or mold in which it is foamed and is covered by a solid skin of polycaprolactam of similar composition.

*Table II*

| Allylic azide | | Formulation code | Characteristics of foam | | |
|---|---|---|---|---|---|
| Identification in Table I | Wt., g. used | | Bulk density, lb./cu. ft. | Color | Cell structure |
| A | 0.16 | 1 | 25.7 | Lt. cream | Fine, uniform. |
| A | 0.16 | 2 | 25.2 | Cream | Do. |
| B | 0.11 | 1 | 24.8 | Lt. cream | Do. |
| C | 0.11 | 1 | 30.8 | Cream | Do. |
| D | 0.11 | 1 | 24.6 | Off-white | Do. |
| D | 0.11 | 2 | 23.2 | ....do | Do. |
| E | 0.12 | 1 | 24.8 | Lt. cream | Do. |
| F | 0.13 | 1 | 32.2 | ....do | Do. |
| G | 0.16 | 2 | 24.9 | Yellow | Do. |
| H | 0.18 | 1 | 24.8 | Lt. cream | Do. |
| I | 0.08 | 1 | 34.7 | Off-white | Do. |

The properties of the foamed polycaprolactam compositions can be varied over rather wide limits, depending upon the formulation used and the processing conditions employed. The amount of blowing agent used may vary from 0.1 to 5.0 weight percent of the caprolactam in the composition, the preferred usage being in the range from 0.1 to 1.5 weight percent. Effects of varying the amount of blowing agent are indicated in Table III for some typical groups of foamable caprolactam compositions containing varying proportions of blowing agents "A" and "I" of Table I. Increased quantities of blowing agent lower the apparent bulk density of the foam and its resistance to deformation by compression, and generally lead to coarser cells and development of additional color.

*Table III*

| Experiment No. | Allylic azide | | Characteristics of foam | | | |
|---|---|---|---|---|---|---|
| | Identification in Table I | Wt. percent caprolactam used | Apparent bulk density, lb./cu. ft. | Cell structure | Color | Compression yield strength, p.s.i.[1] |
| 1 | A | 0.0 | 71 | | | 11,030 |
| 2 | A | 0.5 | 32 | | | 1,590 |
| 3 | A | 0.75 | 27 | | | 590 |
| 4 | A | 1.00 | 23 | | | 240 |
| | | | | | | Compressive[2] modulus, p.s.i. |
| 5 | I | 0.0 | 71.7 | | | 273,333 |
| 6 | I | 0.06 | 61 | | | 221,000 |
| 7 | I | 0.33 | 46 | | | 62,033 |
| 8 | I | 0.6 | 35 | | | 20,333 |
| 9 | I | 0.3 | 42.4 | Very fine | White | |
| 10 | I | 0.6 | 31.2 | ....do | | |
| 11 | I | 0.9 | 24.5 | Med. fine | Off-white | |
| 12 | I | 1.2 | 20.0 | ....do | Cream-white | |
| 13 | A | 1.0 | 24.6 | Fine, uniform | Lt. cream | |
| 14 | A | 3.0 | 13.5 | Med. coarse | Cream orange | |

[1] Method: ASTM D-695-54, at 2% offset.  [2] Method: ASTM D-695.

EXAMPLE 3

This example illustrates foamable caprolactam compositions of this invention which employ some cocatalysts other than those of the isocyanate type.

To caprolactam (9072 g.) at 100° C. was added 86.5 g. of sodium methylate ($CH_3ONa$) and the mixture was sparged with dry nitrogen gas for 45 minutes at the rate of 4000 cc./minute/pound of lactam. The mixture then was degassed at 100° C. for 20 minutes under a vacuum of 24–25 inches of mercury. This treatment removed substantially all of the methanol formed. This mixture was used as the "2% sodium caprolactam mix."

The foamable compositions were as shown in Table IV, and were foamed as described hereinbelow:

*Table IV*

| Formulation | 1 | 2 |
|---|---|---|
| 2% sodium caprolactam mix, g | 40 | 40 |
| Dry caprolactam, g | 20 | 20 |
| Potassium stearate, g | 0.3 | 1.8 |
| Anatase $TiO_2$ (pigment) | 1.2 | |
| Blowing agent "I," Table I, g | 0.18 | 0.18 |
| Cocatalyst, kind | (1) | (2) |
| Cocatalyst, g | 0.3 | 0.25 |

[1] Diphenoxy triazine.
[2] Diphenyl carbamyl chloride.

For Formulation 1, dry caprolactam was melted, the $TiO_2$ and coacatalyst were added, and the mixture in a 38 x 300 mm. "Pyrex" test tube was placed in a 150° C. oil bath while being sparged with dry nitrogen gas until the mixture reached 150° C. The 2% sodium caprolactam mix and potassium stearate together at 150° C. were added to the test tube and sparging was continued for 75 seconds, when the blowing agent was added. After 20 seconds the sparger was removed but the test tube mold was held in the 150° C. bath for 10 minutes. The resulting cream-white foamed polycaprolactam composition had a fine uniform cell structure, a moderately smooth skin, and an apparent bulk density of 47.3 pounds/cubic foot.

The composition of Formulation 2 in Table IV was processed substantially as for Formulation 1 except that the coacatalyst was added last with the blowing agent rather than being mixed with dry caprolactam. The resulting polycaprolactam foam had a cream color, a fine uniform cell structure, a smooth skin, and an apparent bulk density of 44.2 pounds/cubic foot.

EXAMPLE 4

A 2 mole percent catalyst composition was prepared as follows:

Caprolactam was sparged for 30 minutes at 130° C. at a sparging rate of 2000 cc. of $N_2$/min./lb. of lactam. Two mole percent of sodium methoxide was added to the sparged lactam at 100° C., and the methanol formed was sparged from the melt at 100° C. for 1 hour at a sparging rate of 5000 cc. of $N_2$/minute/lb. of lactam.

FORMULATION

|  | G. |
|---|---|
| 2 mole percent sodium caprolactam mix | 80 |
| Technical potassium stearate | 2.4 |
| Cocatalyst, dimethylaminodichlorotriazine (ACT) | 0.55 |
| Blowing agent, $\alpha^1,\alpha^4$-diazidohexamethylbenzene | 0.4 |

PROCEDURE

The sodium caprolactam in a 38 x 300 mm. "Pyrex" test tube was immersed in an oil bath at 150° C. As soon as the mixture was molten, the potassium stearate was added. The melt was agitated with nitrogen sparging and adjusted to 150° C. The ACT cocatalyst and the azide blowing agent were added together and blended into the melt with nitrogen agitation. After 1 minute and 40 seconds (from the time of addition of the ACT) the mixture had become quite viscous. The foamed polymer broke away from the glass mold in 5 minutes and 50 seconds and was ready for removal from the mold.

The cream foam had a fine, uniform cell structure and a density of 0.65 g./cc.

EXAMPLE 5

The formulation and procedure were the same as in Example 1 with the exception that 0.13 g. of 1,3-dimethylurea was added with the ACT and diazide blowing agent.

The mixture had become quite viscous within 58 seconds, and the completed foam had broken from the test tube walls after 2 minutes and 52 seconds. The light cream, fine-celled foam had a density of 0.55 g./cc.

EXAMPLE 6

The procedure was the same as for Example 1 except:

(1) $\alpha^1,\alpha^4$ Diazidohexamethylbenzene was omitted.
(2) 20 seconds after the ACT was added, 0.56 g. of dodecenylazide was stirred into the polymerizable melt.

After 1 minute and 25 seconds, the composition had become quite viscous from advancing polymerization. After 5 minutes and 12 seconds, the foamed polymer had broken from the walls of the mold. The foam resulting had a density of 0.67 g./cc.

EXAMPLE 7

The formulation and procedure were the same as in Example 3 with the exception that 0.13 g. of 1,3-dimethylurea was added with the ACT.

High viscosity point _____ 55 seconds.
Breakaway point _____ 2 minutes, 43 seconds.

The cream foam had a fine, uniform cell structure and a density of 0.60 g./cc.

EXAMPLE 8

3 mole percent sodium caprolactam catalyst mix was prepared as in Example 1 except for the introduction of 3 instead of 2 mole percent of sodium methoxide.

One mole percent preneutralized ACT was prepared by adding a stoichiometric weight of ACT to 3 mole percent sodium caprolactam (2 moles sodium caprolactam per mole of ACT) at 80° C.

FORMULATION

|  | G. |
|---|---|
| 3 mole percent sodium caprolactam mix | 40 |
| 1 mole percent preneutralized ACT mix | 40 |
| Technical potassium stearate | 2.4 |
| $\alpha^1,\alpha^4$-Diazidohexamethylbenzene | 0.4 |

PROCEDURE

The potassium stearate was dissolved in the molten sodium caprolactam mix held in a 38 x 300 mm. "Pyrex" test tube and heated in an oil bath at 150° C. The diazide was dissolved in the 1 mole percent ACT mix. Both mixes were adjusted to 150° C. with $N_2$ mixing, combined, and agitated with $N_2$ until a high viscosity had developed.

High viscosity point _____ 1 minute, 12 seconds.
Breakaway point _____ 3 minutes, 39 seconds.

The foamed polymer was cream in color, had a fine, uniform cell structure, and had a density of 0.52 g./cc.

EXAMPLE 9

The formulation and procedure were the same as for Example 5 with the exception that 0.6 g. of 1-azidomethyl-2,3,5,6 - tetramethylbenzene (monoazidomethyldurene) was substituted for the $\alpha^1,\alpha^4$-diazidohexamethylbenzene (diazidomethyldurene).

High viscosity point _____ 1 minute, 10 seconds.
Breakaway point _____ 4 minutes, 4 seconds.

The cream-yellow foamed polymer had a fine, uniform cell structure and a density of 0.63 g./cc.

Although the novel allylic azides have been exemplified in certain foamable caprolactam compositions, it will be apparent to one skilled in the art that many other foamable ε-caprolactam compositions varying with respect to the base employed to form the catalyst and with respect to the cocatalyst may be employed to achieve a desirable range of properties in the foamed polycaprolactam compositions. As disclosed in the aforementioned copending application, Ser. No. 138,801, many optional ingredients also may be included in the formulation to enhance the appearance or otherwise favorably influence the properties of the finished foamed composition.

Generally in the compositions and process of this invention, the cocatalyst is employed at a concentration of from 0.2 to 2.0 mole percent based on the caprolactam and the anionic catalyst is employed at concentrations of from twice to seven times, on a mole basis, the concentration of the coacatalyst. Preferred concentrations are from 0.2 to 0.8 mole percent of the cocatalyst and from 0.6 to 5 mole percent of the anionic catalyst, depending upon the particular cocatalyst employed, the polymerization temperature, and the rate of polymerization desired. While the polymerization will proceed at temperatures above 100° C., the preferred temperature range for carrying out the process of this invention is from 140° to 190° C. with a temperature of about 140°–160° C. at the start of the reaction being about optimum in most cases in order to achieve good synchronization between polymerization rate and blowing rate with the allylic azide foaming agents.

One particularly preferred class of cocatalyst for use in the compositions and process of this invention is the symmetrical-triazine class described hereinabove. When this class of cocatalyst is employed at a concentration of about 0.5 mole percent with about 2.5 mole percent of the anionic catalyst and 0.1 to 1.5 weight percent of the allylic azide foaming agent, molten monomer at 140°–160° C. is converted into solid foam having uniform, fine cell structure and a smooth skin in about 4–5 minutes.

Polycaprolactam foams of the present invention are particularly suitable as materials of construction since large-sized castings easily may be foamed in low pressure molds at relatively low cost. For example, sets of standard sized bowling pins ("ten pins") were molded from a foamable caprolactam composition of this invention. The pins were light in color, smooth surface, and surprisingly uniform in weight, being approximately in the middle of the range of pin weights allowed by the specifications of the American Bowling Congress. In use, the pins compared very favorably with standard wooden pins both in performance and in durability.

Obviously, the composition and process of this invention can be employed in commercial continuous production processes wherein the ingredients can be continuously mixed and then pumped or poured as the molten, catalyzed monomer mixture into low-pressure molds for the production of an infinite variety of shaped articles, including such standard shapes as sheets, boards, and rods. Usually it is preferable to prepare in advance a mixture of the ε-caprolactam with the anionic catalyst and additives other than the cocatalyst and blowing agent. This catalyzed mixture can then be heated to polymerization temperature (preferably 130°–190° C.) and pumped through a mixing T or other device where the cocatalyst, admixed with additional molten caprolactam monomer and the blowing agent, usually admixed with additional molten caprolactam monomer, are added just prior to filling the mold. Sometimes it is advantageous to add the blowing agent to the filled mold after the other ingredients, but this generally is not necessary. Foamed polycaprolactam articles, prepared according to the process of this invention at temperatures which never exceed 215° C., the melting point of polycaprolactam, possess improved strength and stiffness over foams prepared by blowing molten polycaprolactam followed by solidification, and, in particular, possess superior surface properties in the smooth, unfoamed skins obtainable.

Having thus described and illustrated this invention, it is intended to be limited only by the following claims.

I claim:

1. In a process for making foamed polycaprolactam by the polymerization of ε-caprolactam in the presence of an anionic catalyst prepared from the reaction of a lactam with a base selected from the group consisting of alkali and alkaline earth metal bases and a cocatalyst capable of promoting polymerization of ε-caprolactam at a temperature below the melting point of the resulting polymer, the improvement which comprises conducting the polymerization reaction in the presence of an allylic azide foaming agent having the structure

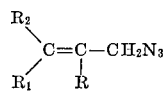

in which at least one azidomethyl group is directly attached to a carbon atom which in turn is attached to another carbon atom by a double bond and wherein R, $R_1$ and $R_2$ are selected from the group consisting of hydrogen, alkyl and aryl, and R and $R_1$ when taken together represent the carbon atoms of the benzenoid ring.

2. The process of claim 1 wherein the allylic azide is 1-azido-5,5,7,7-tetramethyloctene-2.

3. The process of claim 1 wherein the allylic azide is methylbenzyl azide.

4. The process of claim 1 wherein the allylic azide is $\alpha^1,\alpha^4$-diazidohexamethyl benzene.

5. The process of claim 1 wherein the allylic azide is trimethylbenzyl azide.

6. The process of claim 1 wherein the allylic azide is dimethylbenzyl azide.

7. The process according to claim 1 in which the cocatalyst is a symmetrical triazine having the structure

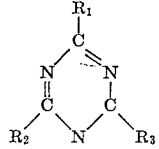

in which $R_1$ is a radical selected from the group consisting of aryloxy, alkaryloxy, nitroaryloxy and halide and $R_2$ and $R_3$ are radicals selected from the group consisting of aryloxy, alkaryloxy, nitroaryloxy, halide, hydrogen, alkyl, alkenyl aryl, alkaryl and dialkylamino.

8. The process according to claim 1 in which the cocatalyst is an organic isocyanate.

9. In a process for making foamed polycaprolactam by the polymerization of ε-caprolactam in the presence of the anionic catalyst, sodium caprolactam, and a cocatalyst capable of promoting polymerization of ε-caprolactam at a temperature below the melting point of the resulting polymer, the improvement which comprises conducting the polymerization reaction in the presence of an allylic azide foaming agent having the structure

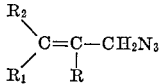

in which at least one azidomethyl group is directly attached to a carbon atom which in turn is attached to another carbon atom by a double bond and wherein R, $R_1$ and $R_2$ are selected from the group consisting of hydrogen, alkyl and aryl, and R and $R_1$ when taken together represent the carbon atoms of the benzenoid ring.

10. The process of claim 9 wherein the foaming agent is 1-azido-5,5,7,7-tetramethyloctene-2.

11. The process according to claim 9 in which the foaming agent is $\alpha^1,\alpha^4$-diazidohexamethyl benzene.

References Cited by the Examiner

UNITED STATES PATENTS

| | | | |
|---|---|---|---|
| 2,532,240 | 11/1950 | Ott | 260—2.5 |
| 2,628,945 | 2/1953 | Wayne | 260—2.5 |
| 2,732,353 | 1/1956 | Fuller | 260—2.5 |
| 2,755,291 | 7/1956 | Broh-Kohn et al. | 260—349 |

(Other references on following page)

UNITED STATES PATENTS

| | | | |
|---|---|---|---|
| 2,764,599 | 9/1956 | Clifford et al. | 260—2.5 |
| 2,769,819 | 11/1956 | Sommers et al. | 260—349 |
| 2,844,595 | 7/1958 | Waisbrot | 260—2.5 |
| 2,930,769 | 3/1960 | Haggis et al. | 260—2.5 |
| 3,017,391 | 1/1962 | Mottus et al. | 260—2.5 |
| 3,060,135 | 10/1962 | Becke et al. | 260—2.5 |
| 3,065,189 | 11/1962 | Becke et al. | 260—2.5 |

OTHER REFERENCES

"Alkyl and Aryl Azides," Boyer et al., reprinted from Chemical Reviews, volume 54, No. 1, February 1954, pages 1–57.

MURRAY TILLMAN, *Primary Examiner.*

LEON J. BERCOVITZ, DONALD E. CZAJA,
*Examiners.*